(12) United States Patent
Carotenuto et al.

(10) Patent No.: US 7,329,700 B2
(45) Date of Patent: Feb. 12, 2008

(54) METHOD OF PRODUCTION OF POLYMER/METAL OR METAL SULPHIDE COMPOSITES, WHICH USES METAL MERCAPTIDES

(75) Inventors: Gianfranco Carotenuto, Capua (IT); Luigi Nicolais, Ercolano (IT); Pietro Perlo, Orbassano (IT); Brunetto Martorana, Orbassano (IT)

(73) Assignee: CRF Societa Consortile per Azioni, Orbassano (Torino) (IT)

( * ) Notice: Subject to any disclaimer, the term of this patent is extended or adjusted under 35 U.S.C. 154(b) by 476 days.

(21) Appl. No.: 10/870,143

(22) Filed: Jun. 18, 2004

(65) Prior Publication Data

US 2007/0293613 A1     Dec. 20, 2007

(30) Foreign Application Priority Data

Jun. 20, 2003 (IT) .......................... TO2003A0469

(51) Int. Cl.
*B05D 3/07* (2006.01)
*C08K 3/00* (2006.01)

(52) U.S. Cl. ...................................... 524/394; 524/415
(58) Field of Classification Search ................ 524/413, 524/418, 419, 420, 434, 435, 394
See application file for complete search history.

(56) References Cited

U.S. PATENT DOCUMENTS 4,812,333 A    3/1989  Micheli 5,955,528 A *  9/1999  Sato et al. .................. 524/413
6,228,904 B1   5/2001  Au et al.
2002/0145132 A1  10/2002  Kang et al.
2006/0121262 A1*  6/2006  Vecchione et al. ....... 428/292.1

FOREIGN PATENT DOCUMENTS

DE         196 39 632 A      4/1998
JP         61-215661     *   3/1985

OTHER PUBLICATIONS

International Search Report dated Apr. 6, 2004.
Carotenuto G et al: "A universal method for the synthesis of metal and metal sulfide clusters embedded in polymer matrices" Journal Of Materials Chemistry, Cambridge, GB, vol. 13, No. 12, 2003, pp. 2927-2930.

* cited by examiner

*Primary Examiner*—Katarzyna Wyrozebski
(74) *Attorney, Agent, or Firm*—Sughrue Mion, Pllc.

(57) ABSTRACT

The method for the production of polymer/metal or metal sulphide composites comprises the stages of: preparing a dispersion of a metal mercaptide in a polymer, the metal of the mercaptide being selected from the group comprising the transition metals and earth metals, and heating the said dispersion so as to cause thermal decomposition of the mercaptide and obtain the corresponding metal or metal sulphide in the form of inclusions in a polymer matrix.

11 Claims, 5 Drawing Sheets

Figure 1:
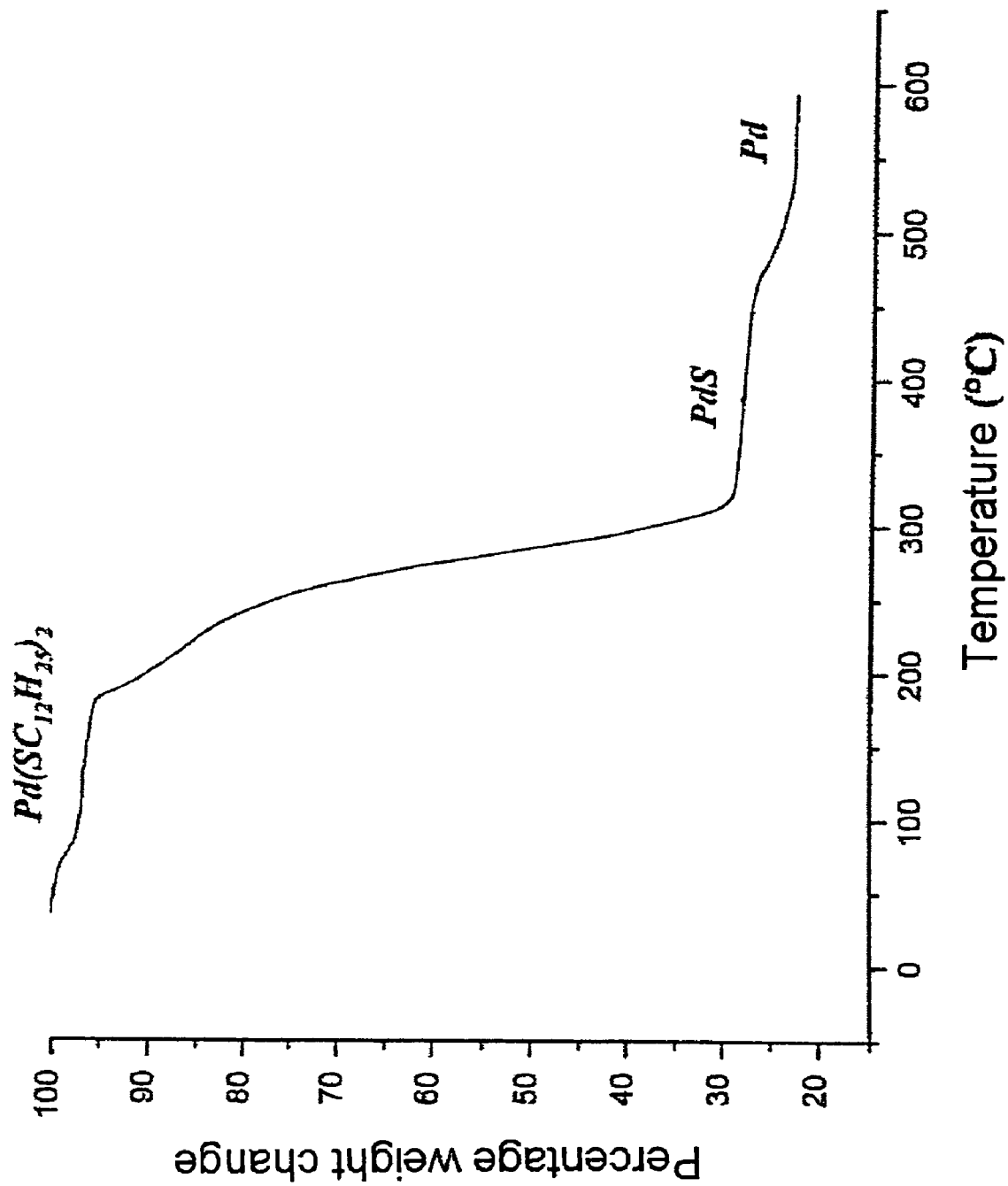

METHOD OF PRODUCTION OF POLYMER/METAL OR METAL SULPHIDE COMPOSITES, WHICH USES METAL MERCAPTIDES

The present invention relates to a method of production of polymer/metal or metal sulphide composites, in particular nanocomposites consisting of metallic particles or particles of metal sulphides dispersed in thermoplastic polymer matrices.

There is at present considerable interest in polymer-metal and polymer-semiconductor nanocomposites, the latter often based on metal sulphides (for example PbS, SnS, etc.), on account of the particular optical, magnetic, electronic and catalytic properties that characterize these materials (see: Mayer A. B. R., Mater. Sci. Eng. C6 (1998)155-166; Caseri W., Macromol. Rapid Commun. 21 (2000) 705-722).

By making composite systems consisting of metallic or semiconductor nanoparticles dispersed in polymer matrices, it is possible to combine the characteristics of materials that are profoundly different from one another. Properties such as magnetism, catalytic activity, electrical and thermal conductivity etc. of metals or semiconductors are combined in this way with the low specific gravity, chemical inertness, easy processability and film-forming ability, reduced cost etc. of polymers. Careful selection of the two components results in composites with new and irreplaceable characteristics, with great potential for application, and that can be processed with technologies that are already well known and are of low cost.

The possibility of using preparative techniques that make it possible to control the quantity and average size of the metallic or semiconductor inclusions is extremely important for the development of these materials, since these parameters determine many of the final characteristics of the material.

Polymer-metal and polymer-semiconductor composites can be obtained by two different preparative schemes. The first, called ex situ, envisages the chemical synthesis of the powdered metal or semiconductor, its surface passivation and finally introduction in the polymer matrix. The second technique, called in situ, envisages the introduction of a precursor (for example an organic salt or an organometallic complex) into the polymer and its subsequent decomposition by means of radiant energy (e.g. thermolysis, photolysis, radiolysis, ultrasound, etc.). The first technique, although very laborious, proves suitable mainly for modifying optical plastics intended for example for making particular optical devices (e.g. colour filters, polarizers, waveguides, etc.), since the optical purity of the resulting composite is very high, as the system does not contain any type of by-product. The first of the two preparative approaches is also advisable in sectors requiring materials that do not release toxic molecules by diffusion (for example in the food and biomedical sectors, etc.). The second technique and especially that based on the thermolysis of precursors that are introduced into the polymer is suitable mainly owing to its simplicity and speed, and can be used where high chemical purity of the final product is not required. In particular, the in-situ techniques make it possible to produce the metal or semiconductor directly during the process of moulding of the thermoplastic polymer. The precursor must, however, be chemically compatible with the thermoplastic polymer so that it can be mixed with it directly and furthermore it must be able to decompose in conditions such that the structural stability of the polymer matrix is not compromised. Obviously, the process conditions of the material must also take into account the thermal decomposition of the precursor.

In the in-situ technique, formation of the metallic or metal sulphide phase envisages three main stages: a first stage of decomposition of the precursor with formation of free atoms or molecules, a second stage of nucleation of the latter with formation of crystal nuclei and a third stage of growth of the nuclei formed. In particular, the atoms or molecules, once produced, will, owing to their small dimensions, be able to migrate easily by diffusion within the polymer matrix and, when their concentration reaches the nucleation threshold, phase separation will be observed. The nuclei produced, being of larger dimensions, will be much less mobile and essentially will increase in size by surface deposition of further atoms and molecules present in the system. The number and final size of the particles will depend on the quantity of precursor and on the process conditions, whereas their shape will be approximately spherical.

Although there is a certain number of organic compounds that can undergo the process of thermal decomposition in conditions compatible with the chemical stability of the polymer, a class of substances permitting the generation of various types of metallic inclusions (transition metals and earth metals, as well as their sulphides) has not yet been described in the literature.

For their part, metallic powders of molybdenum, cobalt and iron have been widely used in the past for desulphurization of gasoline and the decomposition of the resulting mercaptides for the production of artificial sulphur (see: C. M. Friend, D. A. Chen, Polyhedron, 16(18)(1997)3165). This process has been exploited industrially to a small extent for the production of powders of transition metals or their sulphides. Moreover, the use of paints based on mercaptides (resinates) of gold has been proposed in the past for the metallization of ceramic and vitreous substrates (U.S. Pat. No. 6,231,925 of 1 Aug. 1961 in the name of Howard et al.; U.S. Pat. No. 5,707,436 of 13 Jan. 1998 in the name of Fritsche et al.; U.S. Pat. No. 2,984,575 of 16 May 1961 in the name of Howard et al.; U.S. Pat. No. 2,490,399 of 6 Dec. 1949 in the name of Kermit et al.). Metallization with resinates has also been proposed for other metals (U.S. Pat. No. 4,808,274 of 28 Feb. 1989 in the name of Nguyen). Only recently, polymercaptides have been used for the synthesis of minute clusters of gold and palladium (T. G. Shaaff, M. N. Shafigullin, J. T. Khoury, I. Vezmar, R. L. Whetten, W. G. Cullen, P. N. First, C. Gutierrez-Wing, J. Ascensio, M. J. Jose Yacamán, J. Phys. Chem. B 101(40) (1997) 7885-91). Occasionally, mercaptides of tin have been used as additives for polyvinylchloride (PVC) as internal lubricants (U.S. Pat. No. 5,371,149 of 6 Dec. 1994 in the name of Kishida et al.).

The object of the present invention is to supply a method for the production of polymer/metal or metal sulphide composites, using as precursors a class of chemical compounds with which it is possible to obtain metallic or sulphide inclusions with magnetic, catalytic etc. properties that vary significantly depending on their nature.

According to the invention, this aim is achieved by means of a method for the production of polymer/metal or metal sulphide composites, comprising the stages of:

preparing a dispersion of a metal mercaptide in a polymer, the metal of the mercaptide being selected from the group comprising the transition metals and the earth metals, and heating the said dispersion so as to cause thermal decomposition of the mercaptide and obtain the corresponding metal or metal sulphide in the form of inclusions in a polymer matrix.

The mercaptides (also called thiolates) are organosulphur compounds whose structure consists of a metal atom bound to one or more sulphur atoms each bearing an organic group, for example alkyl or aryl. These compounds can be regarded as products of salification of the corresponding mercaptans (or thiols) and can be represented by the formula $Me(SR)_n$, where Me indicates a transition metal or earth metal, R indicates an organic group and n is an integer that corresponds to the valency of the metal.

Preferably the metal is selected from the transition metal group (groups: IIIB, IVB, VB, VIIB, VIIB, IB and IIB of the periodic table of the elements) and of the earth metals (group IIIA of the periodic table of the elements), while the organic group is selected from the long-chain linear aliphatic hydrocarbons (normal alkyl groups, $-C_nH_{2n+1}$, with n>10).

The weight ratio in the dispersion between metal mercaptide and polymer can be advantageously between 0.01 and 0.2, and preferably between 0.05 and 0.1. The dispersion is heated advantageously at a temperature between 100 and 500° C., and more preferably between 150 and 250° C.

An advantageous property of the mercaptides derived from long-chain alkane thiols and transition metals or earth metals is that they are hydrophobic compounds, soluble or at any rate readily dispersible in nonpolar organic solvents (both aliphatic and aromatic hydrocarbons, chlorinated hydrocarbons, ethers, etc.). The hydrophobic nature of these compounds makes them absolutely compatible with many engineering polymers, with which they form homogeneous systems (solid solutions) even at high concentrations. The hydrophobic nature of these compounds is due to the fact that the Me—S bond is heteropolar covalent and that the partial charge present on the two elements is very small on the one hand because of the reduced electronegativity of the sulphur atom and on the other hand because of the moderate electropositivity of the metal. Moreover, the remaining part of the molecule is nonpolar owing to the presence of extensive hydrocarbon residues bound to the sulphur atoms.

Furthermore, the method of the invention exploits advantageously the moderate thermolability of the mercaptides of transition metals and of earth metals. In fact, these compounds decompose quantitatively under the action of heat (thermolysis), releasing metal atoms at temperatures between 100° C. and 300° C. in accordance with the following well-known reaction scheme (in which, for simplicity, reference is only made to a divalent metal):

$Me(SR)_2 \rightarrow Me+R-S-S-R$

In some cases (when for example Me=Sn or Pb) thermal decomposition of the mercaptide leads to the production of metal sulphides:

$Me(SR)_2 \rightarrow MeS+R-S-R$

These sulphides can decompose further at higher temperatures, giving rise to metal and sulphur. The temperatures required for thermal homolysis can be controlled by varying the nature of the organic group R, and thus become compatible with the thermal stability of the polymers and superimposable with those usually employed in their processing in the molten state.

The mercaptides employed in the method of the invention have the further advantage that they can be synthesized chemically in an extremely simple manner and at a quantitative yield. In particular, it is possible to prepare an alcoholic and if necessary alkaline solution (for example sodium or potassium hydroxide in ethanol) of the corresponding mercaptan. An organic or inorganic salt of the transition metal or earth metal (for example acetate, chloride, nitrate etc.) is then added to this solution. The solubility of the salts in alcohol is generally very high. Then, the metal mercaptide is separated from the reaction medium in the form of precipitate, exploiting its nonpolar nature. These reactions can be represented by the following formulae, where X indicates the anion of the salt:

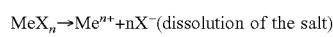
$MeX_n \rightarrow Me^{n+}+nX^-$ (dissolution of the salt)

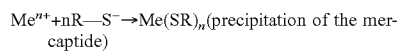
$Me^{n+}+nR-S^- \rightarrow Me(SR)_n$ (precipitation of the mercaptide)

Owing to the presence of unoccupied orbitals on the metal atom (d and f orbitals) and of lone electron pairs on the sulphur atoms, the mercaptide of transition metals generally constitutes polymeric structures of the type:

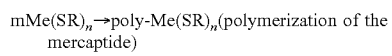
$mMe(SR)_n \rightarrow poly\text{-}Me(SR)_n$ (polymerization of the mercaptide)

The polymeric nature of the mercaptides of transition metals is also very advantageous because it facilitates the dispersion of the mercaptide in the molten polymer, which can take place directly during the operations of shaping of the latter.

The polymer used in the method of the invention can be one of those commonly employed in industry, provided it can with-stand the temperatures necessary for inducing thermolysis of the mercaptide. For example, the said polymer can be selected from the group comprising high-performance thermoplastic polymers (PEEK, PPO, Ultem, capton, etc.), optical plastics (PS, PC, PMMA, etc.) and common engineering polymers (PE, PP, PET, etc.).

Without wishing to be bound to a specific theory, it is possible to hypothesize that the particular mechanism involved in the reaction of thermal decomposition of the metal mercaptide as well as the thermal threshold necessary for it to start are closely connected with the nature of the organic groups present in the mercaptide and with their size.

In particular, heat treatment can cause homolytic splitting of the metal-sulphur bonds, of the sulphur-carbon bonds, or of a metal-sulphur bond and a sulphur-carbon bond. In the first case the thermolysis of the mercaptide will lead to the generation of metal atoms and hence, at the end of the procedure, atomic clusters of metal will be contained in the polymer matrix. In the second and third case, however, molecules of metal sulphide will be generated and therefore the composite produced will contain molecular clusters of metal sulphide. In this connection, it should be pointed out that the second case is essentially a theoretical construction, since it envisages the simultaneous formation of two highly unstable organic radicals and moreover would require the stability for the metal of high states of oxidation (for example +4).

An appropriate choice of the organic group R and in particular of its capacity for stabilizing the radical generated by the thermal homolysis of the bond with sulphur can make it possible to direct the thermolysis towards the formation of the metal or of the sulphide. In fact, if the organic group is capable of stabilizing the corresponding radical, formation of the sulphide will be favoured, otherwise the metal will be obtained. Therefore, groups such as benzyl or allyl, which provide strong resonance stabilization of the corresponding radicals, are able to favour the formation of the metal sulphide. The n-alkyl groups, on the other hand, can stabilize the corresponding radicals only by means of mild hyperconjugative effects and therefore thermolysis will be able to generate both sulphide molecules and metal atoms. The size of the alkyl group will be determining in this case. In this way, metal atoms will be obtained with lower alkyl groups, for example containing up to twelve carbon atoms, on account of their high diffusivity in the molten polymer and hence their possibility of moving away once generated. In contrast, the metal sulphide will be obtained with higher alkyl groups, i.e. having more than sixteen carbon atoms. Finally, branched alkyl groups (e.g. tert-butyl, isopropyl) should favour the formation of the metal relative to the sulphide on account of their absolute inability to stabilize the corresponding radical.

The temperature required for thermal decomposition of the mercaptide also depends on the nature of the organic group R and in particular on its size. As a rule, the larger the alkyl group R, the higher is the temperature necessary for thermolysis. This might be explained on the basis of the greater quantity of kinetic energy that the molecular fragments must possess in order to be able to move away from one another after scission, avoiding recombination.

Consequently, it is possible to select the organic group R to combine with a given metal, so as to make the temperature of thermolysis of the mercaptan, as well as the nature of the compounds that are derived from it, more suitable in the light of the specific requirements.

Figure 2:
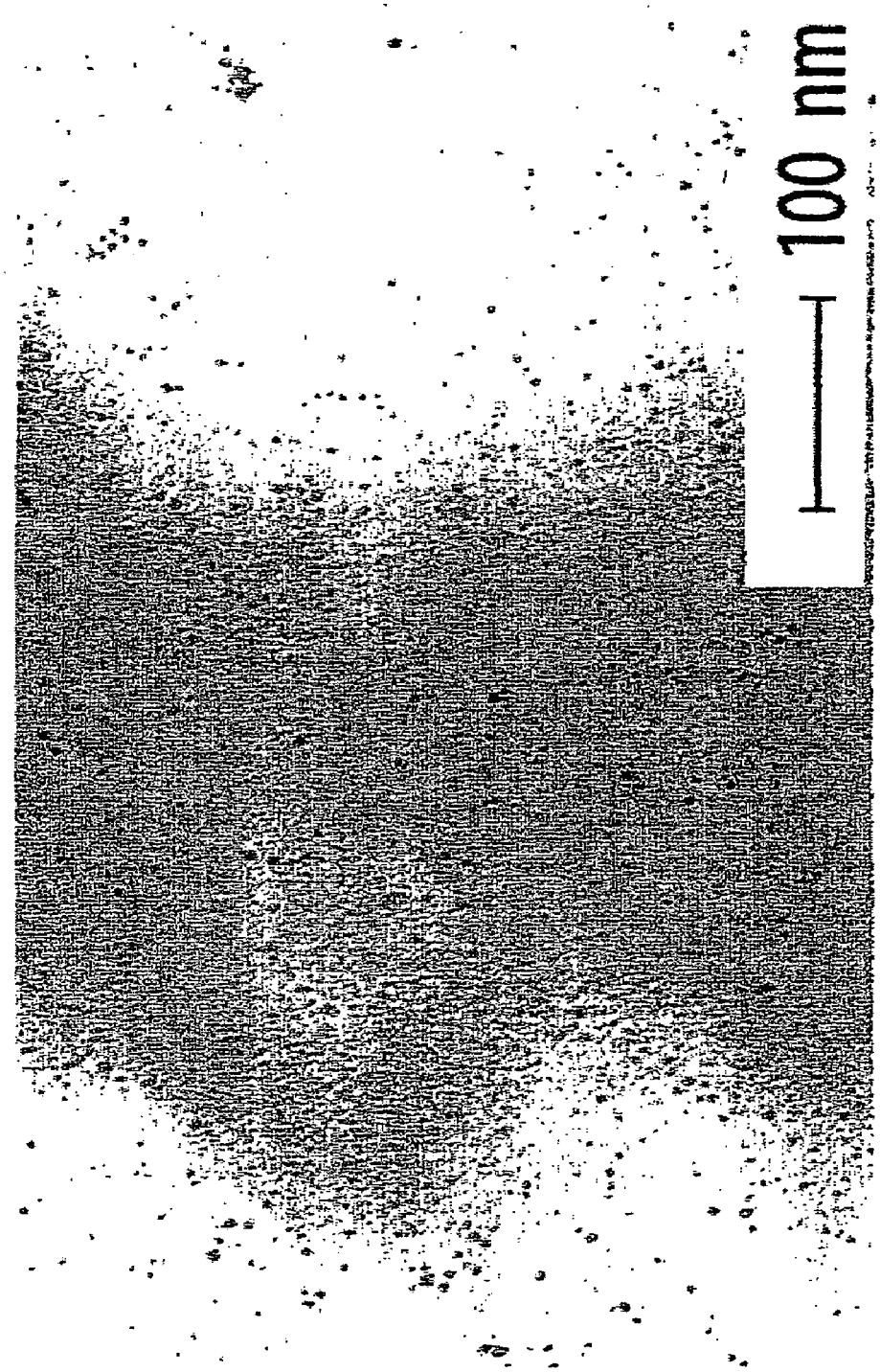
Figure 3:
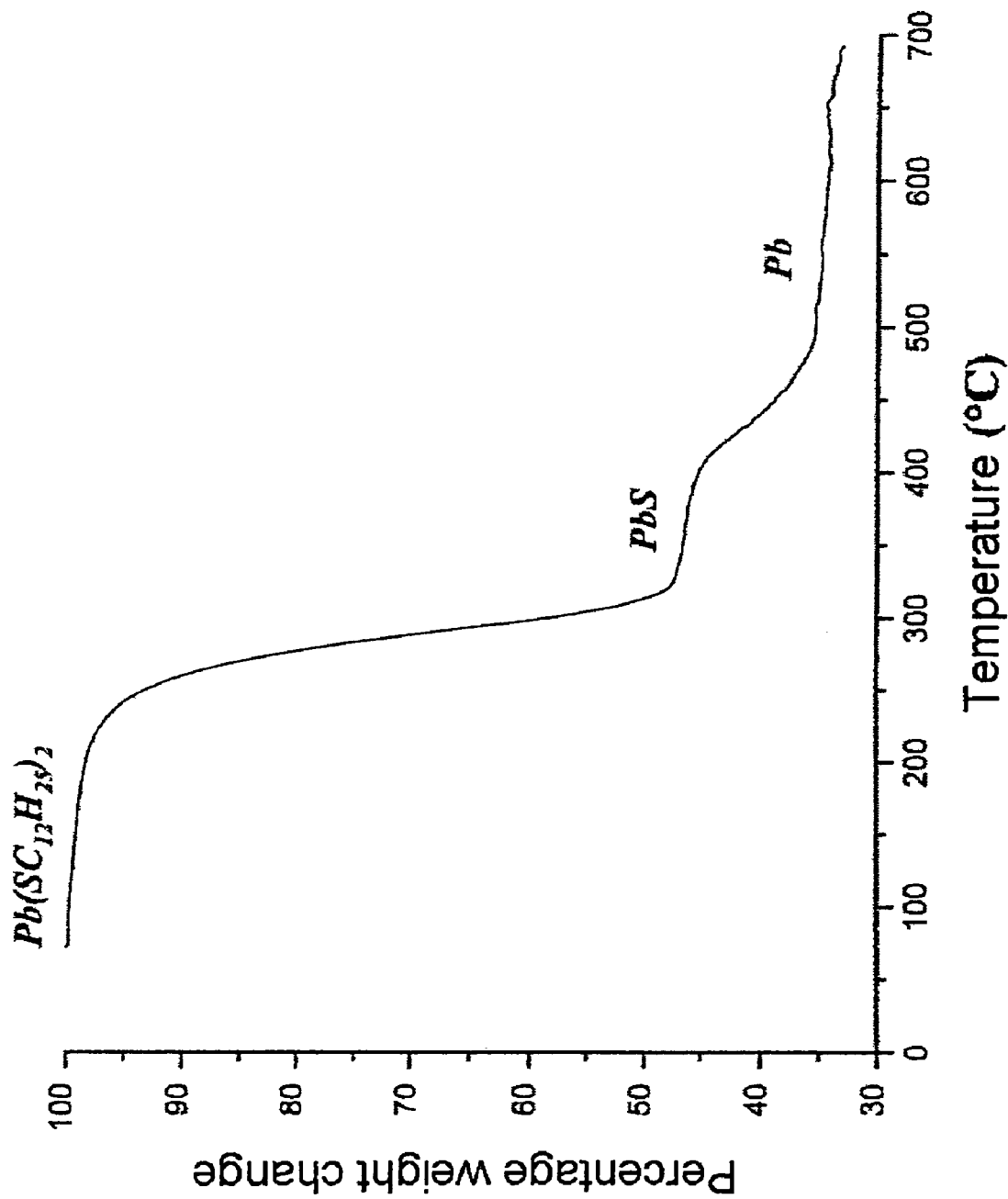
Figure 4:
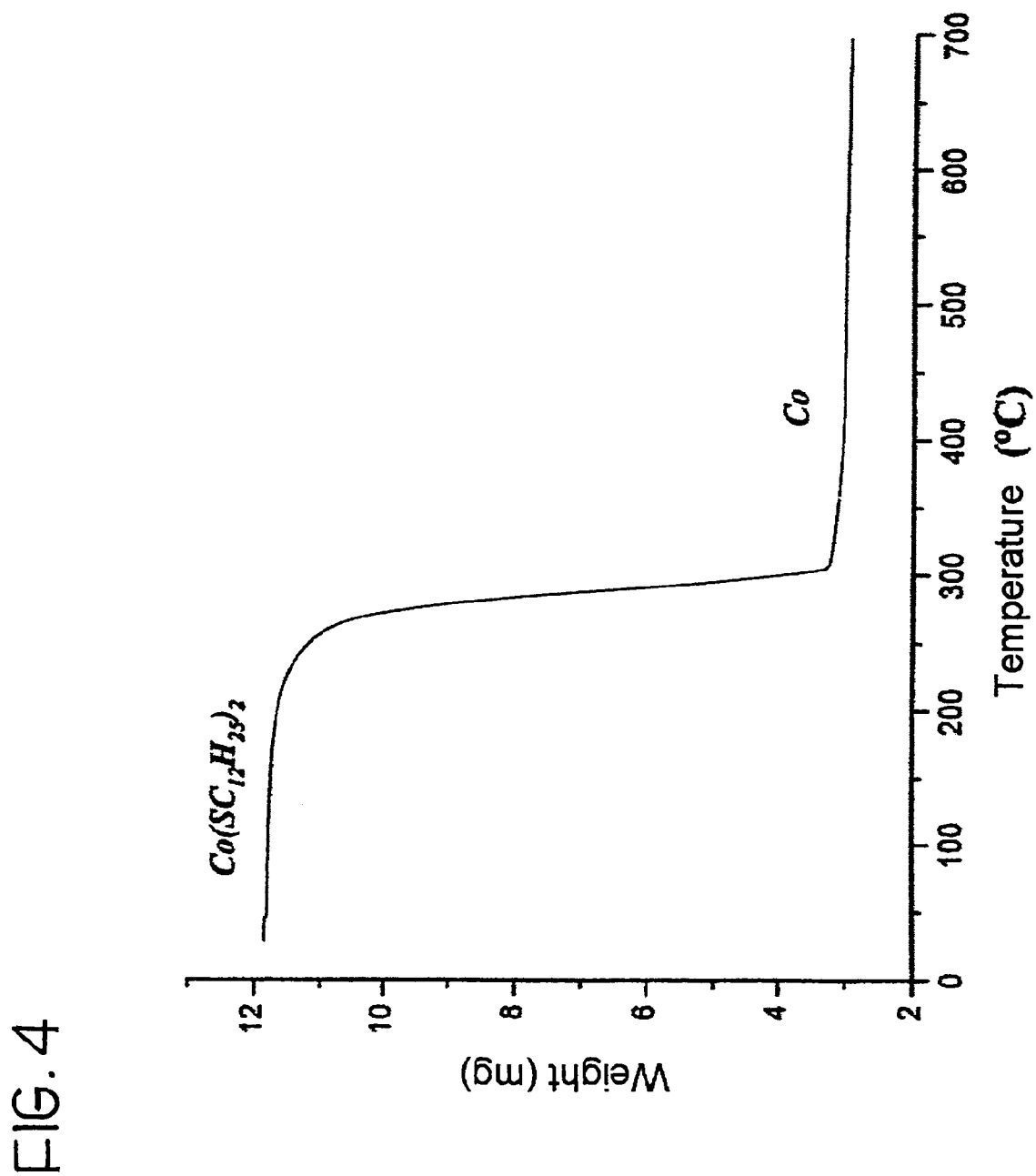
Figure 5:
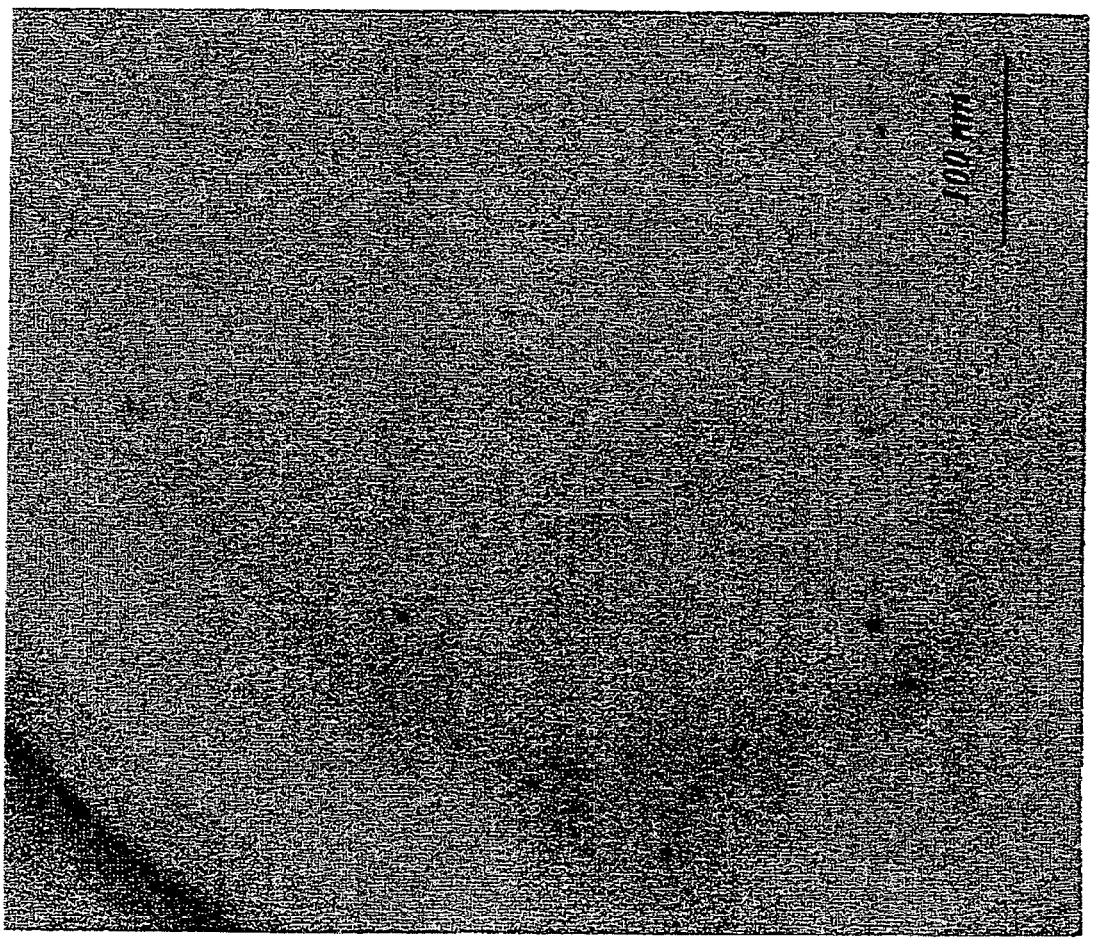

Other advantages and characteristics of the present invention will become clear from the following examples of application, which are given though without constituting any limitation as to the nature of the mercaptide. The description of these examples also refers to the appended drawings, in which:

FIG. 1 is a TGA thermogram of the metal mercaptide (palladium dodecanethiolate) used in example 1, FIG. 2 is a TEM micrograph of the composite material (nanoparticles of elementary palladium in polystyrene) obtained at the end of example 1, FIG. 3 is a TGA thermogram of the metal mercaptide (lead dodecanethiolate) used in example 2, FIG. 4 is a TGA thermogram of the metal mercaptide (cobalt dodecanethiolate) used in example 3, and FIG. 5 is a TEM micrograph of the composite material (nanoparticles of elementary cobalt in polystyrene) obtained at the end of example 3.

EXAMPLE 1

Palladium nitrate was dissolved in ethanol and dodecanethiol was added to the solution, while stirring. The yellow precipitate of palladium dodecanethiolate obtained was separated by centrifugation, washed several times with ethanol or acetone and finally dissolved in hot (50° C.) chloroform and re-precipitated by adding ethanol. The product was separated by centrifugation and then left to dry in the air. A solution of palladium dodecanethiolate in chloroform was then added to a solution of polystyrene in chloroform and the system, after thorough homogenization, was poured onto a glass surface and left to dry. In this way, transparent films of a deep yellow colour were produced, and these were then submitted to heat treatment at 340° C. by means of a sand bath. A thermogravimetric analysis (TGA) was carried out on the palladium dodecanethiolate, as shown in FIG. 1. The thermogram reveals two stages in degradation: the first is determined by the thermal decomposition of the palladium mercaptide which leads to the formation of the corresponding sulphide, and the second is further decomposition of the sulphide, from which the metal is obtained. The microstructure of the inclusions of Pd in polystyrene was visualized by examination by transmission electron microscopy, shown in FIG. 2.

EXAMPLE 2

Lead dodecanethiolate was produced following the procedure described with reference to example 1 and using hydrated lead perchlorate as the starting salt. Slightly opaque films of a deep yellow colour were obtained after dispersing the mercaptide in polystyrene. The films were heat-treated at 200° C. to produce inclusions of lead sulphide and at 350° C. to produce inclusions of metallic lead, by means of a sand bath. The TGA thermogram of the lead dodecanethiolate is shown in FIG. 3.

EXAMPLE 3

Cobalt dodecanethiolate was produced following the procedure described with reference to example 1 and using cobalt chloride as the starting salt. The films of polystyrene-cobalt dodecanethiolate were perfectly transparent, with a deep red colour. These films were then submitted to heat treatment at 200° C. using a sand bath. The TGA thermogram of the cobalt dodecanethiolate is shown in FIG. 4 and the microstructure of the inclusions of Co is shown in FIG. 5.

EXAMPLE 4

Copper dodecanethiolate was produced following the procedure described with reference to example 1 and using hydrated cuprous chloride as the starting salt. The films of polystyrene-copper dodecanethiolate obtained were transparent and of a deep yellow colour. These films were then submitted to heat treatment at 200° C. using a sand bath.

Of course, without prejudice to the principle of the invention, the details of application and the embodiments can vary widely relative to the foregoing purely illustrative description, without departing from its scope as claimed.

What is claimed is:

1. Method for the production of polymer/metal or metal sulphide composites, comprising the stages of:
    preparing a dispersion of a metal mercaptide in a polymer, the metal of the mercaptide being selected from the group comprising the transition metals and the earth metals, and
    heating said dispersion so as to cause thermal decomposition of the mercaptide and obtain the corresponding metal or metal sulphide in the form of inclusions in a polymer matrix.

2. Method according to claim 1, in which said polymer is selected from the group comprising high-performance thermoplastics, optical plastics and ordinary engineering polymers.

3. Method according to claim 1, in which said metal is selected from the metals belonging to the groups: IIIB, IVB, VB, VIIB, VIIB, IB, IIB or IIIA of the periodic table of the elements.

4. Method according to claim 1, in which said mercaptide contains an organic group selected from the long-chain, linear aliphatic hydrocarbons.

5. Method according to claim 1, in which the weight ratio in said dispersion between metal mercaptide and polymer is between 0.01 and 0.2.

6. Method according to claim 1, in which the heating of the dispersion is carried out at a temperature between 100° C. and 500° C.

7. Method according to claim 1, in which said metal mercaptide is obtained as a precipitate that forms as a result of reaction of the corresponding mercaptide in alcoholic solution with an organic or inorganic salt of the metal.

8. Method according to claim 1, in which said dispersion is prepared by mixing a solution of the metal mercaptide in a solvent with a solution of the polymer in the same solvent.

9. Method according to claim 1, in which said mercaptide contains alkyl groups $C_nH_{2n+1}$ with n>10.

10. Method according to claim 1, in which the weight ratio in said dispersion between metal mercaptide and polymer is between 0.05 and 0.1.

11. Method according to claim 1, in which the heating of the dispersion is carried out at a temperature between 150° C. and 250° C.

* * * * *